(12) United States Patent
Fiedler et al.

(10) Patent No.: US 10,937,104 B1
(45) Date of Patent: Mar. 2, 2021

(54) VEHICLE DAMAGE ESTIMATION

(71) Applicant: United Services Automobile Association (USAA), San Antonio, TX (US)

(72) Inventors: Kevin K. Fiedler, Boerne, TX (US); Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 360 days.

(21) Appl. No.: 15/585,601

(22) Filed: May 3, 2017

Related U.S. Application Data

(60) Provisional application No. 62/334,739, filed on May 11, 2016.

(51) Int. Cl.
| | | |
|---|---|---|
| *G06Q 40/00* | (2012.01) | |
| *G06Q 40/08* | (2012.01) | |
| *G06Q 10/00* | (2012.01) | |
| *G06Q 30/02* | (2012.01) | |

(52) U.S. Cl.
CPC ............. *G06Q 40/08* (2013.01); *G06Q 10/20* (2013.01); *G06Q 30/0283* (2013.01)

(58) Field of Classification Search
CPC ..... G06Q 40/08; G06Q 10/20; G06Q 30/0283
USPC .................... 705/35–40, 4, 45–40
See application file for complete search history.

(56) References Cited

U.S. PATENT DOCUMENTS

| | | | |
|---|---|---|---|
| 5,317,503 A | 5/1994 | Inoue | |
| 8,825,277 B2 * | 9/2014 | McClellan | G06Q 10/06 701/32.2 |
| 9,721,400 B1 * | 8/2017 | Oakes, III | G07C 5/0808 |
| 10,332,318 B1 * | 6/2019 | Leise | G06Q 10/20 |
| 2003/0154111 A1 | 8/2003 | Dutra et al. | |
| 2004/0073434 A1 | 4/2004 | Volquardsen et al. | |
| 2014/0309847 A1 * | 10/2014 | Ricci | H04W 4/21 701/33.1 |
| 2015/0294419 A1 * | 10/2015 | Gonzalez Miranda | G06Q 40/08 701/31.6 |
| 2016/0239921 A1 * | 8/2016 | Bray | G06Q 40/08 |

(Continued)

FOREIGN PATENT DOCUMENTS

| | | | | |
|---|---|---|---|---|
| CA | 2828017 A1 * | 8/2012 | ......... | G06F 3/04847 |
| GB | 2523548 A * | 9/2015 | ............. | G07C 5/008 |

OTHER PUBLICATIONS

Lind: "A measure of vulnerability and damage tolerance", Department of Mechanical Engineering, University of Victoria, Victoria, BC, V8W 3P6, Canada, Dec. 19, 1994 (Year: 1994).*

(Continued)

*Primary Examiner* — Edward J Baird

(74) *Attorney, Agent, or Firm* — Fish & Richardson P.C.

(57) ABSTRACT

Methods, systems, and apparatus, including computer programs encoded on a computer storage medium, for receiving an indication that a vehicle has been in a collision. Receiving vehicle information system (VIS) data from a VIS associated with the vehicle. Determining a component damage probability (CDP) for each of a plurality of components of the vehicle based on the VIS data. Determining estimated costs to replace components having respective CDPs above a threshold value. Providing an estimated total repair cost for the vehicle to a user computing device.

20 Claims, 3 Drawing Sheets

(56) References Cited

U.S. PATENT DOCUMENTS

2016/0292759 A1* 10/2016 Gonzalez Miranda ......................
G06F 3/04847

OTHER PUBLICATIONS

Glazduri: "An Investigation of the Potential Safety Benefits of Vehicle Backup Proximity Sensors", Transport Canada, Canada, Paper No. 05-0408 (Year: 2005).*

* cited by examiner

VEHICLE DAMAGE ESTIMATION

CROSS-REFERENCE TO RELATED APPLICATION

This application claims the benefit of the filing date of U.S. Provisional Application No. 62/334,739, filed on May 11, 2016. The contents of U.S. Application No. 62/334,739 is incorporated herein by reference in its entirety.

BACKGROUND

The first question one asks after a vehicle collision is "Is everyone okay?" The second is "How much will this cost me?" Even seemingly minor damage to modern vehicles can be expensive to repair depending on which components are damaged. For example, onboard computers, sensors, and other electronic components can be sensitive to impact. Furthermore, it can be difficult to assess damage from a visual inspection because electronic and physical components may be hidden from view.

SUMMARY

Implementations of the present disclosure are generally directed to autonomously providing vehicle damage estimates after a collision. More particularly, implementations of the present disclosure are directed to gathering and evaluating vehicle sensor data to provide "real-time" damage estimates following a vehicle collision. In some examples, the damage estimate is a rough estimate, for example, a vehicle damage estimate can be provided as an estimate range.

In general, innovative aspects of the subject matter described in this specification can be embodied in methods that include the actions of receiving an indication that a vehicle has been in a collision. Receiving vehicle information system (VIS) data from a VIS associated with the vehicle. Determining a component damage probability (CDP) for each of a plurality of components of the vehicle based on the VIS data. Determining estimated costs to replace components having respective CDPs above a threshold value. Providing an estimated total repair cost for the vehicle to a user computing device. Other implementations of this aspect include corresponding systems, apparatus, and computer programs, configured to perform the actions of the methods, encoded on computer storage devices. These and other implementations can each optionally include one or more of the following features.

In some implementations, the VIS data can include one or more of: vehicle diagnostic data (e.g., post-accident system check), fluid level data, tire pressure data, accelerometer data, vehicle operation data (e.g., braking speed, etc.), and airbag status.

In some implementations, the VIS data can include body damage sensor mapping data obtained from proximity sensors of the vehicle that measure deflections in portions of body panels of the vehicle. In some implementations, the body damage sensor mapping indicates a location of impact on the vehicle. In some implementations, the body damage sensor mapping indicates an extent of body damage to the vehicle.

In some implementations, the methods include determining collision statistics from the VIS data. In some implementations, the collision statistics include one or more of: an impact location, an impact angle, a force of impact, a net impact speed, a type of object impacted, a speed of the impacted object. In some implementations, the CDP for each of the plurality of components is determined based on the VIS data and the collision statistics.

In some implementations, the methods include obtaining vehicle information associated with the vehicle, the vehicle information indicating locations, within the vehicle, of each of the plurality of components of the vehicle, where the CDP for each of the plurality of components is determined based on the VIS data and the vehicle information.

In some implementations, determining estimated costs to replace components having respective CDPs above the threshold value includes obtaining insurance claim data for vehicles similar to the vehicle, and performing a similarity analysis between the insurance claim data and the components having respective CDPs above the threshold value to determine the estimated costs.

In some implementations, the methods include providing, to the user computing device, insurance information from an insurance policy on the vehicle.

In some implementations, the estimated total repair cost for the vehicle includes an estimate range.

These and other implementations can provide one or more advantages. In some examples, implementations of the present disclosure enable autonomous damage estimates at the time of an accident based on data from a vehicle information system. Such estimates may reduce errors in estimating damage, reduce user uncertainties at the time of an accident, and provide improvements to existing vehicle information systems. Implementations of the present disclosure also enhance data collection capabilities. For example, collecting information on vehicle damage can be difficult. Implementations of the present disclosure enable efficient and "real-time" data collection on vehicle damage after a collision.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to autonomously providing vehicle damage estimates after a collision. More particularly, implementations of the present disclosure are directed to gathering and evaluating vehicle sensor data to provide "real-time" damage estimates following a vehicle collision. For example, after an accident, an assessment can be made of the direction and severity of an impact by based on information from sensors in a vehicle information system (VIS). An example VIS can include sensors such as accelerometer, vehicle computer diagnostic system, fluid level sensors, tire pressure sensors, operational sensors (e.g., speedometer, braking sensors), and vehicle body sensors. Such sensor information can then be leveraged in models that estimate of the likelihood of damage to certain components, obtain replacement costs for components, and, in some implementations, perform similarity analysis against empirical data (e.g., insurance claim data). A real-time, damage and repair estimate can then be provided to a user. In some examples, the damage estimate is a rough estimate, for example, a vehicle damage estimate can be provided as an estimate range. In some examples, a more detailed estimate can be provided following further analysis of a vehicle.

As used herein, the term "real-time" refers to transmitting or processing data without intentional delay given the processing limitations of a system, the time required to accurately obtain data, and the rate of change of the data. In some examples, "real-time" is used to describe receiving VIS data from a vehicle over a network connection soon after a collision. For example, "real-time" VIS data may be received from the vehicle while the vehicle is still at the accident scene, and before the vehicle is taken to a services station and connected to a diagnostic computer system. Although there may be some actual delays, the delays are generally imperceptible to a user.

Implementations of the present disclosure will be described in further detail with reference to an example use case. The example use case includes a collision between two vehicles. It is contemplated, however, that implementations of the present disclosure can be used in any appropriate use case.

Figure 1:
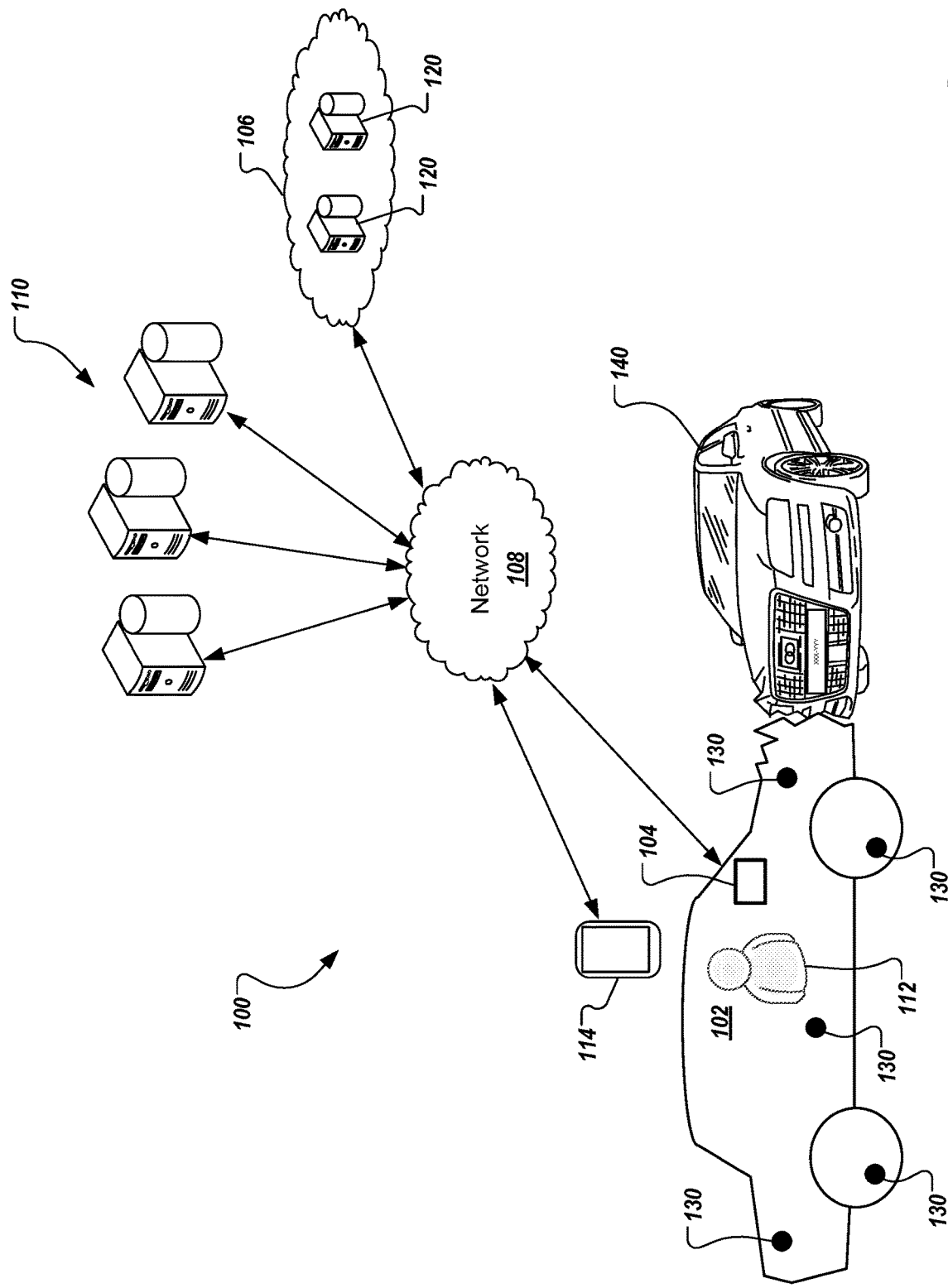
FIG. 1 depicts an example system in accordance with implementations of the present disclosure.

FIG. 1 depicts an example system 100 that can execute implementations of the present disclosure. The example system 100 includes a vehicle 102 with a VIS 104 in communication with a back-end system 106 over a network 108. In some examples, the vehicle 102 is driven by a user 112.

In some implementations, the vehicle 102 is an Internet-connected vehicle that is able to communicate with computing devices (e.g., the back-end system 106) over the network 108. For example, the VIS 104 includes computing and networking hardware and software that enables communication over the network 108. In some examples, the network 108 includes a local area network (LAN), wide area network (WAN), the Internet, a cellular network, a satellite network, one or more wireless access points, or a combination thereof, and connects web sites, user devices (e.g., the computing device 120), and the back-end systems (e.g., back-end system 106). In some examples, the network 108 can be accessed over a wired and/or a wireless communications link. For example, mobile computing devices, such as smartphones can utilize a cellular network to access the network 108.

In some examples, the VIS 104 is provided as a network of vehicle sensors 130 in communication with at least one processor (or microcontroller) and at least one electronic storage component. The VIS 104 monitors the vehicle data from the sensors 130 and can control vehicle functions based on the sensor data. For example, the sensors 130 include, but are not limited to, tire pressure sensors, fluid level sensors, vehicle diagnostic systems sensors, proximity sensors, airbag sensors, vehicle operation sensors (e.g., speed and breaking sensors), inertial sensors (e.g., accelerometers), and vehicle body damage (VBD) sensors (described in more detail below with reference to FIG. 2). In some examples, the VIS 104 can monitor and process data from the sensors 130. For example, and without limitation, the VIS 104 can monitor and record sensor data. In the event of a collision, the VIS 104 can send data from the sensors 130 to the back-end system 106.

In some implementations, the VIS 104 can include a geo-location system. For example, the vehicle information system 104 can include a GPS receiver as part of a navigation system.

In the depicted example, the back-end system 106 includes at least one server system 120. In some examples, the at least one server system 120 hosts one or more computer-implemented services that users can interact with using computing devices. For example, the VIS 104 can include one or more computing devices therein, which can be used to communicate with a service hosted by the back-end system 106 over the network 108. In some examples, in the event that the vehicle 102 is involved in a collision with an object 140 (e.g., another vehicle), the back-end system 106 receives VIS data from the vehicle's VIS 104. The back-system 106 can automatically generate a rough estimate of the damage to the vehicle 102 using the VIS data. In some examples, the back-end system 106 can send the damage estimate to the VIS 104 for display to a user on a display screen in the vehicle 102. In some examples, the back-end system 106 can send the damage estimate to a user computing device 114.

In some implementations, the back-end system 106 can be provided by a service provider. An example service provider can be an entity that provides one or more services to a user of the vehicle. An example entity can include a financial institution (e.g., a bank or insurance provider) that provides automobile insurance on the vehicle 102. For example, the financial institution can refine damage estimates based on historical vehicle damage records (e.g., from insurance claims). Accordingly, the entity (e.g., financial institution) can maintain a database of vehicle information that can be accessed for generating damage estimates.

The computing device 114 is associated with a user 112. In some examples, the computing device 114 can include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. Furthermore, the computing device 114 can communicate with the back-end system 106 over the network 108.

In some implementations, the back-end system 106 accesses additional information for generating a damage estimate from one or more third-party data sources (TPDS) 110. The TPDSs 110 can be implemented using one or more computing devices (e.g., servers) configured to interface with the back-end system 106 over the network 108. The computing devices on which the TPDSs 110 are implemented can have internal or external storage components and can represent various forms of server systems including, but not limited to a web server, an application server, a proxy server, a network server, or a server farm. Furthermore, the computing devices on which the TPDSs 110 are implemented each can include one or more processors for executing instructions stored in storage and/or received from one or more other electronic devices, for example over network 108. In addition, these computing devices also typically can include network interfaces and communication devices for sending and receiving data. The TPDSs 110 can include, but are not limited to, vehicle data servers containing information about various vehicle makes, models and years (e.g., a vehicle manufacturer's database), vehicle parts supplier databases, and an insurance database containing insurance policy information for the vehicle 102.

Implementations of the present disclosure are generally directed to autonomously providing vehicle damage estimates after a collision. More particularly, implementations of the present disclosure are directed to gathering and evaluating vehicle sensor data to provide "real-time" damage estimates following a vehicle collision. In accordance with implementations of the present disclosure, a VIS 104 sends VIS data to the back-end system 106 in the event of a collision. The back-end system 106 can generate a damage estimate based on the VIS data and, in some examples, additional information from TPDSs 110.

In accordance with implementations of the present disclosure, the VIS 104 detects when a collision has occurred. In some examples, the VIS 104 can detect a collision based on data received from sensors 130. For example, a collision can be detected based on an airbag sensor indicating that the air bag has been deployed. In some examples, a collision can be detected based on data readings from inertial sensors. In some examples, a collision can be detected based on data readings from inertial sensors in combination with braking data (e.g., hard braking). In some examples, a collision can be detected based on data from body damage sensors.

In some implementation, the VIS 104 obtains data from before, during, and after the collision and sends the VIS data to the back-end system 106. VIS data from before and/or during the collision can include, but is not limited to, vehicle speed, braking data, geo-location data, and inertial sensor data (e.g., acceleration values and directions from the impact of the collision). VIS data from after the collision can include, but is not limited to, vehicle system diagnostic data (e.g., a post-accident system check), fluid levels, tire pressures, and air bag status.

For example, a driver of a vehicle 102 may have a low speed collision with another car 140. The VIS 104 can detect the following information about the vehicle: the impact was on the left front corner of the vehicle 102 at a lateral angle; the vehicle 102 was moving at 15 mph; the brakes were applied for 1.2 seconds before impact; the airbags did not deploy; and the coolant level in the vehicle 102 is low and decreasing. The VIS 104 can inform the back-end system 106 of the collision and send the VIS data to the back-end system 106. In some implementations, the VIS data is sent to the back-end system 106 in real-time.

The back-end system 106 uses the VIS data to determine probabilities that various components of the vehicle 102 have been damaged in the collision. The damage probability for vehicle components is referred to herein as a component damage probability (CDP). In some examples, the back-end system 106 determines a CDP for all components of a vehicle. In some examples, the back-end system 106 can determine a CDP for only vehicle components that are near the area of impact. In some examples, the back-end system 106 can determine CDPs for a specified subset of vehicle components. For example, the back-end system 106 can have component lists for various makes and models of vehicles. In some implementations, the back-end system 106 can determine which vehicle components to calculate a CDP based on the VIS data. For example, if the VIS data indicates that the collision was likely a minor fender bender, the back-end system 106 can generate CDPs for only components in the area of impact. Conversely, for example, if the VIS data indicates that the collision was a major accident, the back-end system 106 can generate CDPs a greater range of vehicle components.

For instance, using the VIS data from the low-speed collision example discussed above, the back-end system 106 may generate the following CDPs: a 99.9% likelihood that the left headlight is broken, a 99.3% likelihood that the bumper will need to be replaced, a 98.7% likelihood that the left front fender panel will need to be replaced with a 47% likelihood that the left front fender can be repaired, a 92.6% likelihood that the radiator and transmission fluid cooler will need to be replaced, a 78% likelihood that the battery was damaged, a 63% likelihood that the hood is crumpled and will need to be replaced, and a 10% likelihood that the right front tire was damaged. In some implementations, the CDPs can be generated based on data from prior insurance claims associated with similar accidents and/or similar vehicles.

In some implementations, the back-end system 106 can obtain information from a TPDS 110 to generate more refined CDPs. For example, the back-end system 106 can access information about the location of various components within the vehicle 102 from a vehicle manufacturer database (e.g., vehicle schematics). In some implementations, such information can be used by the back-end system 106 to determine which components to calculate a CDP for and/or to aid in determine the CDPs for components. For example, if vehicle information obtained from a manufacturer database indicates that the vehicle's battery is in the left front corner of the engine compartment, the back-end system 106 can identify the battery as a likely damaged component if the collision impact was on the left front corner of the vehicle 102. The back-end system 106 can use the manufacturer information in conjunction with the VIS data to determine the CDP for the battery.

In some implementations, the back-end system 106 determines collision statistics based on the VIS data. The collision statistics can then be used to determine the CDP for various components of the vehicle 102. For example, the back-end system 106 can use the VIS data to determine statistics including, but not limited to, a location of impact, an impact angle, a force of impact, a net impact speed (e.g., the combined speed of two vehicles), a speed of the impacted object, a type of object impacted (e.g., a moving object or a stationary object), etc. For example, an impact force can be determined based on the speed and weight of the vehicle 102 and its deceleration. As another example, a net impact speed can be determined based on the impact force, the vehicle's speed, the vehicle's deceleration, and the vehicle's weight. Furthermore, the speed of the impacted object may be determined based on the net impact speed and speed of the vehicle 102. In some implementations, the back-end system 106 can use the collision statistics in conjunction with the VIS data to determine the CDPs for vehicle components. In some implementations, the back-end system 106 can use the collision statistics in conjunction with the VIS data and third-party data vehicle information (e.g., manufacturer data) to determine the CDPs for vehicle components.

For instance, continuing the low-speed collision example discussed above, the back-end system 106 may calculate that based on the weight of the vehicle 102 the force of the collision was 827 ft/lbs of force. Further, based on the force of impact and the weight of the vehicle 102, the back-end system 106 may determine that the net impact speed was 18 mph. The VIS data indicated that the vehicle 102 was traveling at 15 mph at the time of impact, therefore, the back-end system 106 may further determine that the object struck was moving towards the vehicle 102, but at a slower speed.

The back-end system 106 compares the respective CDP of individual components to a threshold value to determine which components will likely need to be repaired or replaced to determine the aggregate damage to the vehicle 102. Vehicle components having a respective CDP that exceeds a threshold value are identified as probable damaged components (PDC). In some examples, the components that are identified as PDCs form the basis of a total repair cost estimate. For example, the back-end system 106 can produce a list of PDCs and generate estimated repair costs for the PDCs individually or as a whole. In some examples, the back-end system 106 obtains cost estimate information from a TPDS 110 for some or all of the PDCs. For example, the back-end system 106 can obtain replacement costs for PDCs from vehicle parts supplier databases and/or insurance claims databases. In some examples, the back-end system 106 can obtain labor rates for repair or replacement of PDCs from automobile industry databases and/or insurance claims databases.

In some implementations, threshold values for identifying PDCs can be derived based on aggregate analyses of accident claims (e.g., insurance claims). For example, various threshold values can be determined and categorized based on similar accident characteristics such as, but not limited to, point of impact, speed, impact forces (e.g., forces detected from vehicle sensor data). For example, vehicle components may be more or less likely to be damaged in different types of collisions (e.g., collisions with different impact locations and occurring at different speeds). In some implementations, threshold value used to identify PDCs in any specific accident can be further modified or weighted based on an analysis of accident claims associated with similar vehicles (e.g., similar make, model, and/or year vehicles).

For example, if a 2009 Acme Motor Corporation (AMC) minivan is rear ended by another vehicle traveling at 20 miles per hours, a threshold value for identifying PDCs of the minivan is selected from a set of PDC threshold values. For example, a threshold value related to rear end collisions occurring at speeds between 0-25 miles per hour may be selected. As noted above, the threshold values in the set of PDC threshold values can each be generated and categorized based on similar accident characteristics such as, but not limited to, point of impact, speed, impact forces (e.g., forces detected from vehicle sensor data). Further, for example, the selected PDC threshold value can be refined based on an analysis of accident claims associated with 2005-2010 model year AMC minivans. For example, various components of 2005-2010 AMC minivans may be more or less prone to damage in rear end collisions than the average vehicle. The refined threshold value can then be used to identify PDCs.

In some implementations, the back-end system 106 can verify repair estimates against empirical data. For example, the back-end system 106 can perform a similarly analysis between the calculated repair estimate and historical repair estimate for the same or similar make and model vehicles. In some implementations, the back-end system 106 can perform a similarly analysis between the calculated repair estimate and actual repair data for the same or similar make and model vehicles. For example, the back-end system 106 can access historical insurance claims and associated repair costs for the same or similar make and model vehicles.

For instance, continuing the low-speed collision example discussed above, the back-end system 106 may employ a 50% likelihood of damage threshold to identify the left headlight, the bumper, the left front fender panel, the radiator and/or transmission fluid cooler, the battery, and the hood as PDCs. Each of these components has a CDP greater than 50%. Only the front tire has a CDP less than 50%. Thus, the front tire would not be included in a list of PDCs. The back-end system 106 can use the list of PDCs to generate a total repair estimate of, for example, between $2,800 and $3,700 for the vehicle 102.

Once the total repair cost has been evaluated and, optionally, verified against empirical data, the back-end system 106 can provide the estimate to the user 112. For example, the back-end system 106 can send the estimate to the VIS 104 in the vehicle 102. The VIS 104 can then present the estimate to the user 112 on a display in the vehicle 102. In some implementations, the back-end system 106 can send the estimate to a computing device 114 associated with the user. For example, the vehicle display may be damaged during the collision. Thus, the back-end system 106 can, instead, send the estimate to the user 112 based on contact information for the user obtained from a user account (e.g., an insurance account). For example, the back-end system 106 can send the estimate to the user through e-mail, SMS message, or as a notification in a mobile application. In some implementations, a customer service representative may call the user 112 with the estimate or an automated customer service system may call the user 112 with the estimate.

In some implementations, the back-end system 106 can provide the user with additional information about the insurance coverage for the vehicle 102. For example, it may be valuable to a user 112 to know total insurance coverage on the vehicle 102, the deductible. Therefore, the back-end system 106 can send additional information with the estimate including, but not limited to, the insurance coverage amount for the vehicle 102, the insurance deductible amount, an estimate of the market value of the vehicle (e.g., to determine whether the vehicle is likely to be considered as "totaled"), an estimated repair time for the damage to the vehicle, and whether the insurance policy has a rental car option.

In some implementations, the estimate and additional insurance information can be presented to the user in a mobile application associated with the insurance company. In such implementations, the user can be provided with an option to begin the claims process immediately. For example, the back-end system 106 may have sufficient data from the VIS to automatically submit an electronic insurance claim for the user 112.

To complete the low-speed collision example, the back-end system 106 may perform the following conversation with the user 112 through a text messages, through a mobile application, and/or through a phone call.

| | |
|---|---|
| SYSTEM: | It appears you've been in an accident, is everyone alright? |
| USER: | Yes, I'm fine. |
| SYSTEM: | Was another vehicle involved? |
| USER: | Yes. |
| SYSTEM: | Please exchange insurance information and file a police report. |
| USER: | The police are on the way. |
| SYSTEM: | We have assessed the incident from what we know of your vehicle and information we collected at the time of the impact. Would you like to see high level estimates at this time? |

-continued

USER: Yes
SYSTEM: From what we can tell, we estimate damage to your vehicle to be between $2800 and $3700. The estimated current value of your car is about $14,500.
Your deductible is $500. In accidents like this it is typical for repairs to take 11 to 17 days. You have rental car reimbursement on your policy. Would you like to initiate the claims process now?
USER: Yes, . . .

Figure 2:
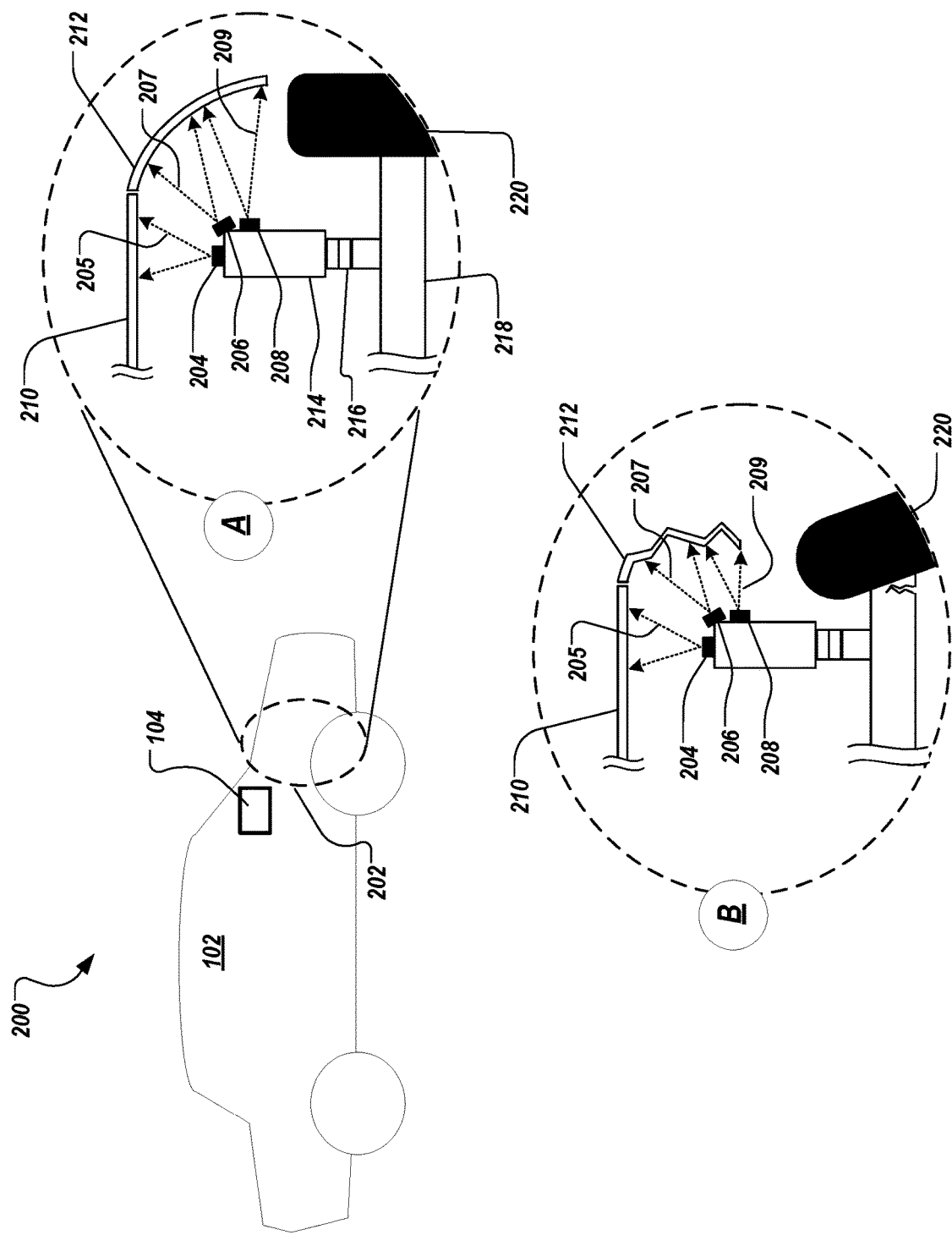
FIG. 2 an example vehicle body damage sensor system in accordance with implementations of the present disclosure.

FIG. 2 depicts an example vehicle body damage (VBD) sensor system 200 in accordance with implementations of the present disclosure. In some implementations, a VBD sensor system 200 can be included in a VIS, such as VIS 104 described above. A VBD sensor system 200 includes a plurality of VBD sensors 204-206 that monitor the body panels 210, 212 of a vehicle 102. For example, the VBD sensors 204-206 can be proximity sensors that measure a distance from the sensor to a respective body panel 210, 212.

As a whole VBD sensor system 200 can map the distance between a body panel 210, 212 and each respective sensor for an undamaged vehicle 102. The "map" of an undamaged vehicle forms the basis for detecting and determining the extent of any vehicle body damage. When a body panel 210, 212 is damaged the distance between the panel and a respective sensor changes. Such changes can be detected by the VIS 104 to determine, for example and without limitation, that the vehicle has been damaged, a location of the damage, and an extent of the damage. For example, the location of the damage can be determined based on which of the VBD system 200 sensors indicate measurements that have changed from the respective undamaged vehicle measurements. The extent of the damage can be determined based on a magnitude of such change.

In more detail, FIG. 2 depicts two detailed views (A and B) of the right front fender section 202 of a vehicle. Detail A shows a VBD sensor system 200 in an undamaged vehicle 102. Detail A includes three VBD sensors 204, 206, 208, each configured to monitor distances 205, 207, 209 between the sensor and a respective portion of one of the two body panels; a hood 210 and a fender 212. The VDB sensors 204, 206, 208 are mounted on a frame 214 of the vehicle 102. For context, detail A also shows the vehicle suspension 216, axel 218, and tire 220.

Although the VBD sensors 204, 206, 208 are illustrated as mounted on the frame 214 of the vehicle 102, it should be appreciated that VBD sensors can be mounted on any portion of the vehicle 102 including the body panels themselves. For example, a VBD sensor mounted on a body panel (e.g., the underside of hood 210) can measure the same or a similar distance (e.g., distance 205) as one mounted on the frame 214 (e.g., sensor 204), but the distance would be measured in a reverse direction (e.g., from the body panel to the frame) although the magnitude of the distance would be the same.

As discussed above, the VBD sensors 204, 206, 208 each measure respective distances 205, 207, 209 from the sensor to the undamaged body panels 210, 212. The VIS 104 can record the undamaged body panel measurements as a digital model of the undamaged vehicle panels. The change in a particular sensor (or sensors) measurement(s) can, thus, be an indication of a damage to a respective body panel 210, 212.

For example, detail B shows the VBD sensor system 200 in a damaged vehicle 102. As depicted in detail B, the distances 207 and 209 measured by VBD sensors 206 and 208 have changed due to the damage to the fender 212. However, the distance 205 measured by VBD sensor 204 to the undamaged hood 210 remains unchanged. The VIS 104 can detect the damage to the fender 212 based on the measured changes in distances 207 and 209. Furthermore, in some implementations, the VIS 104 can determine the extent of the damage based on the magnitude of the changes in distances 207 and 209. For example, change in distances 207 and 209 may indicate that the fender is not merely dented, but has crumpled inwards by approximately three inches.

In some implementations, the VIS 104 can determine additional data about the damage or about a collision that caused the damage from the measured distance changes. For example, the change in distance 209 (measured by VBD sensor 208) is greater than that of distance 207 (measured by VBD sensor 206), therefore, the VIS 104 can determine that the lower portion of the fender is damaged more than the upper portion. In some implementations, the VIS 104 can incorporate additional sensor data, for example, to further evaluate the cause of the damage. For example, the tire pressure may be low indicating that the tire 220 has been blown. The tire pressure data in combination with the determination that the lower portion of the fender is damaged more than the upper portion may indicate that the location of impact was about at the top edge of the tire 220.

In some implementations, the VBD sensor data can be sent to the back-end system for further analysis. For example, the back-end system can store a more comprehensive model of the vehicle's body panels. In addition, the back-end system may be capable of performing more detailed analyses based on the VBD sensor data. For example, the VIS 104 can be configured to take periodic samples of the VBD sensor data. The time sampled VBD sensor data can be analyzed to determine more detailed information about the damage and the collision, for example the rate of change in the VBD sensor data can be analyzed to provide more details about the collision.

In some implementations, the VDB sensors 206 can be wireless devices. For example, the VDB sensors 206 can communicate with the VIS 104 through a wireless communication channel. The wireless channel can include a low-power local network (e.g., Bluetooth, Zigbee, Wireless USB, Z-wave, etc.). Such an implementation may permit a user to retrofit a vehicle with VBD sensors 206.

In some implementations, the VDB sensors 206 can be cameras. The VDB sensors 206 can send image data to the VIS 104. The VIS 104 can perform image processing techniques to determine changes in distance between a VDB sensor 206 and a body panel 210, 212 based one or more images of the body panel 210, 212. For example, the VIS 104 can use images from two adjacent VDB sensors 206 to determine the distance to a body panel 210, 212 using stereoscopic image processing techniques. The VIS 104 can also determine changes in shape of the body panel 210, 212 based on the image data.

In some implementations, one or more of the VDB sensors 206 can include active or passive radio frequency identification (RFID) telemetry circuits. For example, each VDB sensors 206 can include a wireless transmitter and receiver (or a transceiver). For example, each sensor 116 can include an active or passive RFID telemetry circuit. For example, the VIS 104 can periodically query the VDB sensors 206 using a radio frequency signal. The VDB sensors 206 can use energy from the signal to provide temporary power to the sensor. The energy from the signal can provide sufficient power for the VDB sensors 206 to respond to perform a distance measurement and respond to the signal.

Figure 3:
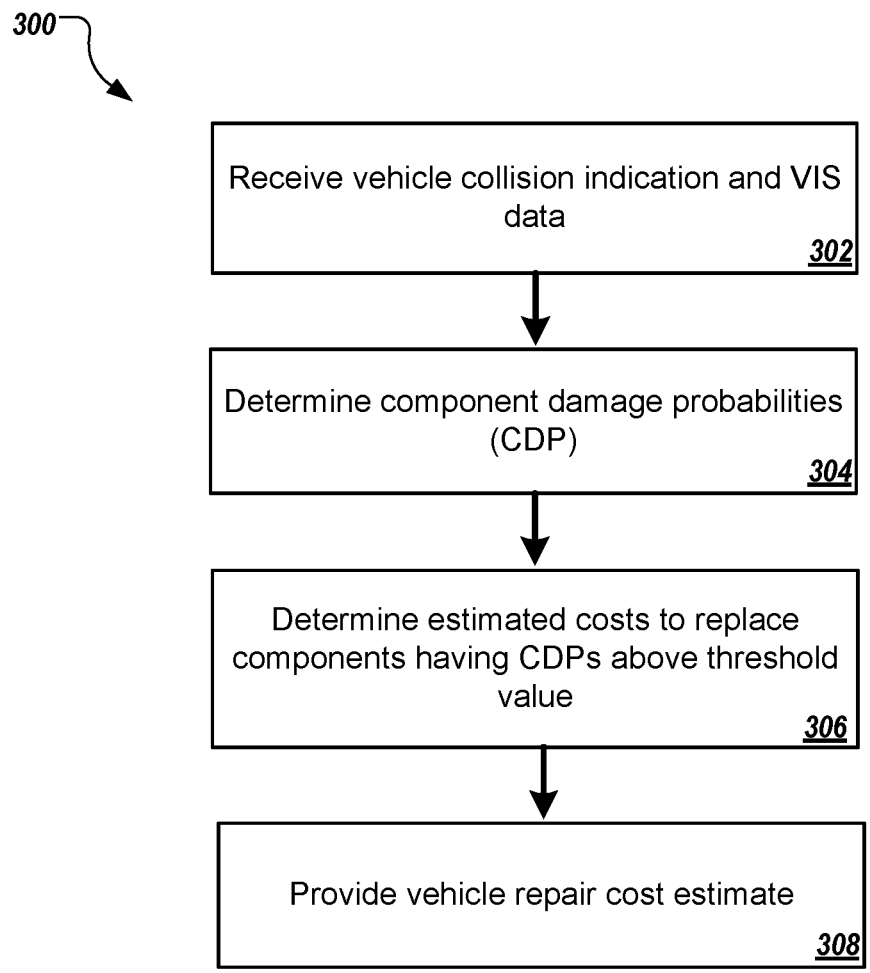
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example system 100 of FIG. 1. In some examples, the example process 300 can be provided by one or more computer-executable programs executed using one or more computing devices. For example, the example process 300, or portions thereof, can be provided by one or more programs executed by one or more computing devices.

An indication that a vehicle has been in a collision and vehicle information system (VIS) data associated with the vehicle are received (302). For example, collision indication and VIS data can be received at a back-end system hosted by a third party service provider (e.g., a financial institution, bank, insurance company, automobile service center, etc.). The VIS data can include, but is not limited to, vehicle diagnostic data (post-accident system check), fluid level data, tire pressure data, accelerometer data, vehicle operation data (braking, speed, etc.), and airbag status data, and vehicle body damage (VBD) sensor data. In some implementations, the VBD sensor data includes vehicle body mapping data obtained from proximity sensors of the vehicle that measure deflections in portions of body panels of the vehicle. In some examples, the sensor mapping data indicates a location of impact on the vehicle and/or an extent of body damage to the vehicle. The VIS data can include data obtained by a VIS before, during, and after a collision. For example, and without limitation, the VIS data can include the vehicles speed before the collision, inertial sensor data from during the collision, and system diagnostic data from after the collision.

Component damage probabilities (CDPs) are determined (304). For example, CDPs can be determined based on the VIS data. A CDP can be determined for each component of the vehicle. In some examples, a CDP can be determined for each of a subset of vehicle components. For example, a CDP can be determined for each component within a portion of the vehicle near the area of impact. As another example, a CDP can be determined for each component a having a repair/replacement cost above a threshold value (e.g., components that, if damaged, would significantly impact a repair cost estimate).

In some implementations, collision statistics are generated from the VIS data to aid in determining CDPs. Collision statistics can include, but are not limited to, determining an impact location, an impact angle, a force of impact, a net impact speed, a type of object impacted, a speed of the impacted object. In such implementations, CDPs can be determined based on the VIS data and the collision statistics.

In some implementations, vehicle information associated with the vehicle can be obtained from a third-party data source (TPDS). For example, vehicle information can include information indicating locations, within the vehicle, of vehicle components. In such implementations, the CDPs for can be determined based on the VIS data and the vehicle information. For example, if a vehicle component is located near an area of impact, there may be a higher likelihood that the component was damaged. In addition, the vehicle information can be used to identify subsets of components for which CDPs should be determined.

Estimated costs to replace components having a CDP above a threshold value are determined (306). For example, the CDP values for each component can be used to identify a list of components that will likely need to be replaced. Replacement costs for the identified components can be obtained from databases at the back-end system or from a TPDS. In some implementations, the estimated costs to replace the identified components can be verified against empirical data. For example, insurance claim data can be obtained for vehicles similar to the vehicle. A similarity analysis can be performed between the insurance claim data and the identified components to determine or verify the estimated costs. For example, the insurance claim data may verify labor rates in a particular geographical region.

A vehicle repair cost estimate is provided to a user (308). For example, the vehicle repair cost estimate can be sent to the VIS of the vehicle and presented to the user on a display in the vehicle. In some examples, the repair cost estimate can be sent to a computing device associated with the user. In some examples, the insurance information associated with the vehicle can be sent to the user along with the repair cost estimate. In some examples, the vehicle repair cost estimate is provided as an estimate range. For example, the repair cost estimate may be a rough estimate and provided as a range of costs (e.g., $2,000-$3,000).

In some implementations, the analysis includes a determination of whether the damage to the vehicle may be a "total loss" by comparing the estimated repair costs to an estimated value of the vehicle. In addition, the vehicle repair cost estimate can include an indication of whether the damage will result in a "total loss."

Moreover, the analysis processes discussed above based on real-time VIS data improve the accuracy with autonomous systems can estimate damage to a vehicle. For example, the use of real-time VIS data to determine CPDs may improve the accuracy of damage analyses. The combined use of real-time VIS data and vehicle specific information to refine CDPs may further improve the accuracy of such analyses. The integration of VBD sensors to a VIS system can improve the accuracy and reliability of vehicle damage information provided by such systems.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., such as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a plurality of proximity sensors mounted on a frame of a vehicle, each sensor positioned on the frame to measure a distance from the sensor to a particular portion of a body panel of the vehicle, and each sensor configured to transmit a distance measurement to a vehicle information system (VIS) of the vehicle;
at least one processor; and
a data store coupled to the at least one processor having instructions stored thereon which, when executed by the at least one processor, causes the at least one processor to perform operations comprising:
receiving, from the VIS, an indication that the vehicle has been in a collision and vehicle information system (VIS) data, the VIS data including one or more distance measurements from one or more of the proximity sensors mounted on the frame of the vehicle, each of the one or more distance measurements indicating a change in the distance between a respective one of the proximity sensors and a respective portion of a respective body panel that respective one of the proximity sensors is positioned to measure compared to a prior distance measurement from the respective one of the proximity sensors;
determining an extent of body damage to the vehicle based, at least in part, on a magnitude of the change in the distance received from a particular one of the proximity sensors;
determining, based on the VIS data, a component damage probability (CDP) for each of a plurality of components of the vehicle;
determining, for each component of the vehicle having its respective CDP above a threshold CDP value, an estimated cost to replace the component;
determining an estimated total repair cost for the vehicle based on a) the estimated cost to replace each component of the vehicle having its respective CDP above the threshold CDP value, and b) the extent of the body damage; and
providing, in real-time to a user computing device, the estimated total repair cost for the vehicle.

2. The system of claim 1, wherein the VIS data includes one or more of: vehicle diagnostic data, fluid level data, tire pressure data, accelerometer data, vehicle operation data, and airbag status.

3. The system of claim 1, wherein the estimated total repair cost for the vehicle includes an estimate range.

4. The system of claim 1, wherein the operations comprise determining a location of impact on the vehicle based, at least in part, on identifying at least one proximity sensor associated with a measurement, from among the one or more distance measurements, that is different from a previous distance measurement by the at least one proximity sensor.

5. The system of claim 1, wherein the operations comprise obtaining vehicle information associated with the vehicle, the vehicle information indicating locations, within the vehicle, of each of the plurality of components of the vehicle, and
wherein the CDP for each of the plurality of components is determined based on the VIS data and the vehicle information.

6. The system of claim 1, wherein determining estimated costs to replace components having respective CDPs above the threshold value comprises:
obtaining insurance claim data for vehicles similar to the vehicle; and
performing a similarity analysis between the insurance claim data and the components having respective CDPs above the threshold value to determine the estimated costs.

7. A non-transitory computer readable medium storing instructions that, when executed by at least one processor, cause the at least one processor to perform operations comprising:
receiving, from a vehicle information system (VIS) of the vehicle, an indication that the vehicle has been in a collision and VIS data, vehicle, the VIS data including body
wherein the vehicle includes a plurality of proximity sensors mounted on a frame of the vehicle, each sensor positioned on the frame to measure a distance from the sensor to a particular portion of a body panel of the vehicle, and each sensor configured to transmit a distance measurement to a vehicle information system (VIS) of the vehicle, and
wherein the VIS data includes one or more distance measurements from one or more of the proximity sensors mounted on the frame of the vehicle, each of the one or more distance measurements indicating a change in the distance between a respective one of the proximity sensors and a respective portion of a respective body panel that respective one of the proximity sensors is positioned to measure compared to a prior distance measurement from the respective one of the proximity sensors;
determining an extent of body damage to the vehicle based, at least in part, on a magnitude of the change in the distance received from a particular one of the proximity sensors;
determining, by the at least one processor and based on the VIS data, a component damage probability (CDP) for each of a plurality of components of the vehicle;
determining, by the at least one processor and for each component of the vehicle having its respective CDP above a threshold CDP value, an estimated cost to replace the component;
determining, by the at least on processor, an estimated total repair cost for the vehicle based on a) the estimated cost to replace each component of the vehicle having its respective CDP above the threshold CDP value, and b) the extent of the body damage; and providing, in real-time to a user computing device, the estimated total repair cost for the vehicle.

8. The medium of claim 7, wherein the VIS data includes one or more of: vehicle diagnostic data, fluid level data, tire pressure data, accelerometer data, vehicle operation data, and airbag status.

9. The medium of claim 7, wherein the operations comprise determining a location of impact on the vehicle based, at least in part, on identifying at least one proximity sensor associated with a measurement, from among the one or more distance measurements, that is different from a previous distance measurement by the at least one proximity sensor.

10. The medium of claim 7, wherein the operations comprise determining collision statistics from the VIS data.

11. The medium of claim 10, wherein the collision statistics include one or more of: an impact location, an impact angle, a force of impact, a net impact speed, a type of object impacted, a speed of the impacted object.

12. The medium of claim 10, wherein the CDP for each of the plurality of components is determined based on the VIS data and the collision statistics.

13. The medium of claim 7, wherein the operations comprise obtaining vehicle information associated with the vehicle, the vehicle information indicating locations, within the vehicle, of each of the plurality of components of the vehicle, and wherein the CDP for each of the plurality of components is determined based on the VIS data and the vehicle information.

14. The medium of claim 7, wherein determining estimated costs to replace components having respective CDPs above the threshold value comprises:

obtaining insurance claim data for vehicles similar to the vehicle; and performing a similarity analysis between the insurance claim data and the components having respective CDPs above the threshold value to determine the estimated costs.

15. The medium of claim 7, wherein the operations comprise providing, to the user computing device, insurance information from an insurance policy on the vehicle.

16. The medium of claim 7, wherein the estimated total repair cost for the vehicle includes an estimate range.

17. The system of claim 1, wherein the operations comprise determining collision statistics from the VIS data, the collision statistics including one or more of: an impact location, an impact angle, a force of impact, a net impact speed, a type of object impacted, and a speed of the impacted object, and wherein the CDP for each of the plurality of components is determined based on the VIS data and the collision statistics.

18. A computer-implemented method executed by at least one processor, the method comprising:

receiving, by the at least one processor and from a vehicle information system (VIS) of the vehicle, an indication that the vehicle has been in a collision and VIS data, vehicle, the VIS data including body wherein the vehicle includes a plurality of proximity sensors mounted on a frame of the vehicle, each sensor positioned on the frame to measure a distance from the sensor to a particular portion of a body panel of the vehicle, and each sensor configured to transmit a distance measurement to a vehicle information system (VIS) of the vehicle, and wherein the VIS data includes one or more distance measurements from one or more of the proximity sensors mounted on the frame of the vehicle, each of the one or more distance measurements indicating a change in the distance between a respective one of the proximity sensors and a respective portion of a respective body panel that respective one of the proximity sensors is positioned to measure compared to a prior distance measurement from the respective one of the proximity sensors;

determining an extent of body damage to the vehicle based, at least in part, on a magnitude of the change in the distance received from a particular one of the proximity sensors;

determining, by the at least one processor and based on the VIS data, a component damage probability (CDP) for each of a plurality of components of the vehicle;

determining, by the at least one processor and for each component of the vehicle having its respective CDP above a threshold CDP value, an estimated cost to replace the component;

determining, by the at least on processor, an estimated total repair cost for the vehicle based on a) the estimated cost to replace each component of the vehicle having its respective CDP above the threshold CDP value, and b) the extent of the body damage; and providing, in real-time to a user computing device, the estimated total repair cost for the vehicle.

19. The method of claim 18, further comprising determining a location of impact on the vehicle based, at least in part, on identifying at least one proximity sensor associated with a measurement, from among the one or more distance measurements, that is different from a previous distance measurement by the at least one proximity sensor.

20. The method of claim 18, further comprising determining collision statistics from the VIS data, the collision statistics including one or more of: an impact location, an impact angle, a force of impact, a net impact speed, a type of object impacted, and a speed of the impacted object, and wherein the CDP for each of the plurality of components is determined based on the VIS data and the collision statistics.

* * * * *